United States Patent [19]

Lima et al.

[11] Patent Number: 5,659,142
[45] Date of Patent: Aug. 19, 1997

[54] PROCESS FOR THE ACQUISITION OF AN INTERNAL LOG OF A PARAMETER THROUGHOUT A PIPELINE

[75] Inventors: Paulo César Ribeiro Lima, Rio de Janeiro; César José Moraes Del Vecchio, Niterói, both of Brazil

[73] Assignee: Petroleo Brasileiro S.A. - Petrobras, Rio de Janeiro, Brazil

[21] Appl. No.: 567,043

[22] Filed: Dec. 4, 1995

[30] Foreign Application Priority Data

Dec. 4, 1994 [BR] Brazil ................... 9404856-8

[51] Int. Cl.⁶ ........................................... B32B 1/06
[52] U.S. Cl. ............................................... 73/865.8
[58] Field of Search ............... 73/86, 865.8; 324/220; 374/143, 148

[56] References Cited

U.S. PATENT DOCUMENTS

| | | |
|---|---|---|
| 3,754,275 | 8/1973 | Carter et al. ............... 324/220 |
| 3,875,606 | 4/1975 | Landers . |
| 3,949,292 | 4/1976 | Beaver et al. . |
| 4,083,076 | 4/1978 | Girard . |
| 4,389,461 | 6/1983 | Scott . |
| 5,358,573 | 10/1994 | Sivacoe . |

*Primary Examiner*—Robert Raevis
*Attorney, Agent, or Firm*—Sughrue, Mion, Zinn, Macpeak & Seas

[57] ABSTRACT

A process for the acquisition of an internal log of a parameter, throughout a pipeline, comprises traversing a pipeline (40) with a pig (30) having a housed in its interior a sensor (31) for continuously sensing and recording the parameter log throughout the whole extend of the pipeline (40). The body (36) of the pig (30) is essentially made up of foamed polymeric or elastomeric material of specific gravity less than 40 kg per cubic meter, thus allowing the passage of the pig (30) past any reduction in diameter of pipeline (40), and thus rendering possible the employment of the measurement of a parameter gradient by means of pigs in long pipelines which are of considerable extend and/or are located in sites of difficult access or even in highly deformed pipelines. The measurement of pressure gradient is used in the monitoring of clogs which hinder the flow of fluids.

9 Claims, 2 Drawing Sheets

PROCESS FOR THE ACQUISITION OF AN INTERNAL LOG OF A PARAMETER THROUGHOUT A PIPELINE

FIELD OF THE INVENTION

This invention refers to a process for acquiring the internal log of a parameter, for example the static pressure log throughout a pipeline, directed mainly at determining scattered and/or extended cloggings causing load losses in the flow of liquids and/or gases through such pipelines.

BACKGROUND OF THE INVENTION

The solid deposits which are formed inside a pipeline transporting liquid products and/or gases reduce the effective transport cross-sectional area and cause problems to the flow. Such problems are all the more serious when the pipelines carry crude petroleum oil or its related products, particularly when the respective pipelines extend over long distances. If paraffinic crude is to be transported and there is a paraffin wax deposit on the pipe walls, a first approach to solve the problem would be to induce melting of the deposit by localized heating. Nevertheless, it is not an easy job to effect the heating of these pipelines because, in general, such pipelines are very long and the clogged sites are not easily accessible, particularly in the case of submerged or buried pipelines. Therefore, processes were developed to apply in situ heating to cause the melting of meltable deposits (particularly paraffin wax) and their subsequent removal by mechanical means.

GB-A-2276218, hereby incorporated as reference, describes a thermo-chemical dewaxing process of hydrocarbon transmission conduits which comprises applying to the partially clogged pipeline, in the direction of the flow, a water-in-oil emulsion made up of inorganic reagents which are made to react and generate nitrogen gas and heat, the paraffin clog being fluidized and removed by flushing slugs.

EP-A-0642847, also incoporated as reference, relates to a pig designed to be employed in pipelines having meltable paraffin deposits which can be made to melt by providing a foam pig with heat-generating reagents either by impregnating its pores or by placing such reagents inside a cavity of the pig, so that upon reaction the reagents produce a strongly exothermic reaction whereby the displacement of the pig along the pipeline, together with the heat produced by the exothermic reaction, melts the paraffin deposits which are thereby entrained and removed from the pipeline together with the pig.

However, such prior art processes show serious drawbacks related to the scheduling of the start and the duration of the thermo-chemical reactions involved. Inasmuch as such processes are based on the displacement of chemical reagents which, upon reaction or by the effect of certain physical-chemical processes, cause localized heating at critical sites partially clogged by deposits of meltable solids, a certain time period for displacement of the reagents must be allowed before the exothermic reaction begins or ceases to remain active. However, chiefly in the case of subsea or buried pipelines, such scheduling is inaccurate due both to a lack of efficient methods for determining the site where the deposits occur on the walls of the pipelines, as well as to the long extents of such pipelines.

A pointed out above, such inaccuracy is greatly accentuated for long subsea or buried pipelines to which the conventional technique, of measuring the pressure log throughout the pipeline either by attaching pressure sensors to the pipeline or by displacing an instrumentation pig along the pipeline, cannot be applied, since either (i) the attachment of such sensors and the data they provide is rendered impossible, or (ii) such instrumentation pigs are highly sophisticated, expensive and extremely sensitive and delicate so that their use being restricted to pipelines of limited extend and nearly clean condition, otherwise such sophisticated instrumentation can be at least damaged, and more probably become jammed and even destroyed if used within a heavy-clogged pipe.

SUMMARY OF THE INVENTION

It is an objective of the invention to provide an improved process for the monitoring of the log of a parameter along a pipeline, aimed at determining precisely the location and extend of clogged regions or of any other interferences, such process being carried out with the aid of a pig provided with a pressure sensor in its interior.

In spite of the present process being intended for a general application, it is specially directed to pipelines of considerable extent, and most particularly, the present process is directed to identifying precisely the sites of clogging caused by the build-up of organic deposits along such long pipelines or other conduits which carry fluids from subsea petroleum wells, the build-up of such clogs constituting a serious problem as stated hereinbefore.

Accordingly the present invention provides a process for the acquisition of a log of a physical parameter throughout a pipelines, which comprises traversing the pipeline with a pig having housed therein: a sensor for the respective parameter; and means for continuously sensing and recording the log of that parameter throughout the whole extent of the pipeline wherein the body of the pig is made up of foamed polymeric or elastomeric material of a specific gravity less that 40 kg per cubic meter, and the pig passes by any reduction in diameter of the pipeline.

Broadly, the present invention encompasses placing various kinds of sensors in the interior of a pig for obtaining logs of physical variables, for example, a pressure sensor, a temperature sensor, a speed sensor, etc.

Traversing the pipeline by such a pig with a pressure sensor fixed in place in said interior allows acquisition of a pressure log leading to a quick, safe, efficient and more economical location of the clogged sites.

BRIEF DESCRIPTION OF THE DRAWINGS

One embodiment of the process of the present invention will now be described, merely by way of example, with reference to accompanying drawings, in which.

DESCRIPTION OF A PREFERRED EMBODIMENT

Figure 1:
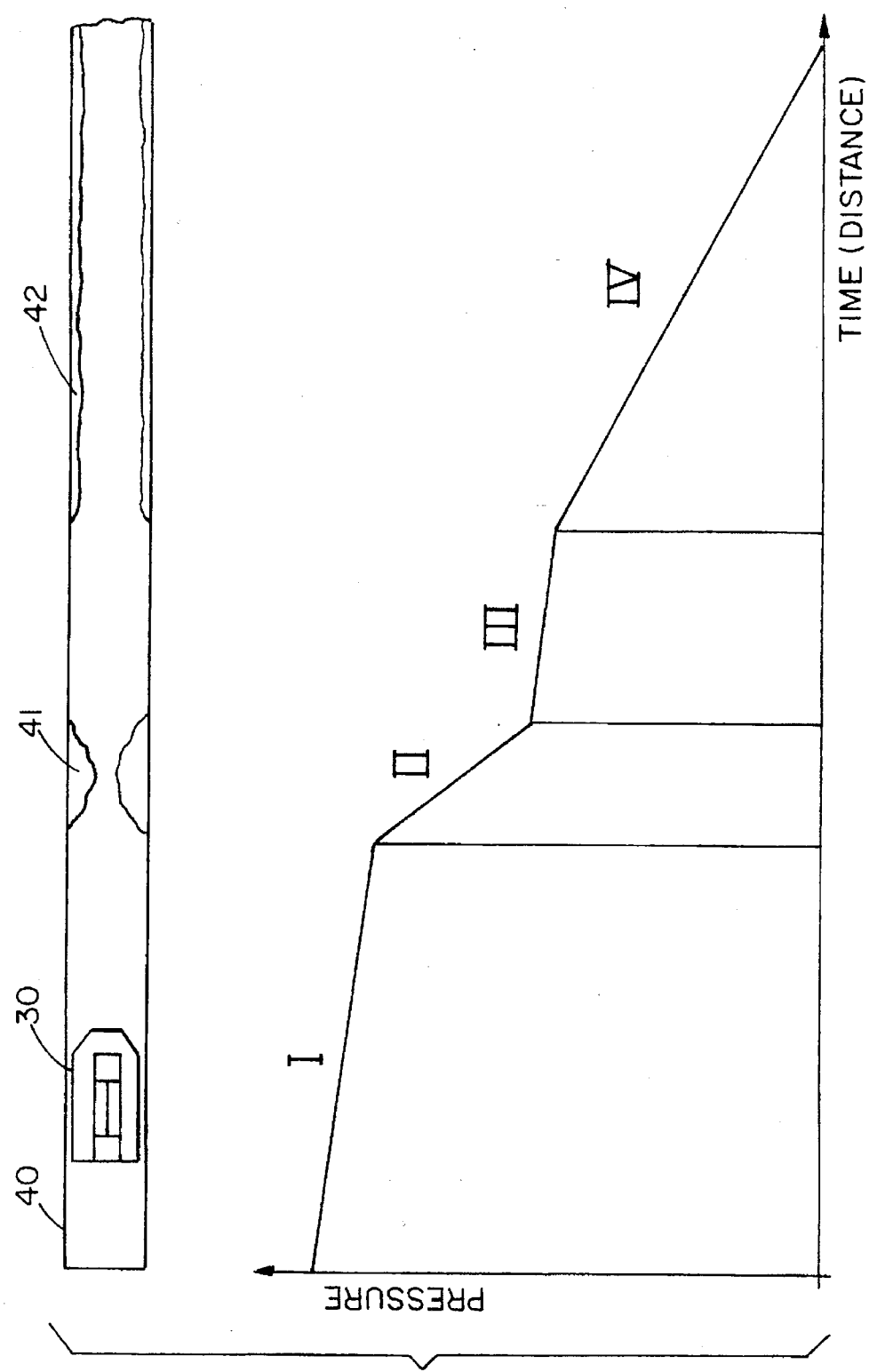
FIG. 1 is an illustrative view of a pipeline for carrying produced oil and/or gas, shown with a pig according to the invention being displaced within the pipeline and also showing a graph of the pressures acquired throughout such system.

FIG. 1 of the drawings schematically illustrates the process according to the present invention for obtaining the internal static pressure gradient (pressure log) along a pipeline using a pig (30) which is driven by a pressure differential caused by the flow of produced liquid and/or gas within a pipeline (40). A sensor in the pig can locate scattered (41) or extended (42) clogs which would lead to flow load losses by the system. After being displaced along the whole pipeline extent, pig (30) is removed and recovered.

The sensor housed in the interior of pig (30) detects and records pressure values thus allowing that the displacement of pig (30) to be accompanied by the continuous recording of pressure values along the whole of the extent of the pipeline and leading to the acquisition of a continuous pressure log of the pipeline.

Generally, the sensor suitable to be inserted in the interior of the pig is an analog sensor which collects physical data such as pressure, these data being recorded either in a digital memory or plotted in a graph. Thus the pressure log can be either drawn by an operator or be directly plotted in a graph by an instrument coupled to the sensor.

The acquired pressure log for pipeline (40) is shown on the same FIG. 1 as a plot of pressure vs. time. As can be seen from this plot, after being introduced into the pipeline, the sensor in the pig senses the local pressure in the pipeline. In those pipeline sections free of clogs the pressure gradually decreases, basically due to load losses by wall friction. However, when the pig (30) encounters a clogged area an additional pressure drop is sensed, as illustrated by sections II and IV of the plot. Pressure sensors suitable for use with the present process are commercial analog sensors, and even a diver's equipment for sensing pressure can be used.

Thus, throughout the displacement of the pig (30) along the pipeline (40), a pressure-time record is developed which is representative of the main features of the existing clogs (sections II and IV of the plot). Since the rate of displacement of pig (30) in pipeline (40) is known, the location and extent of the clogged regions can be determined.

Further, if necessary a speed sensor can also be placed within the pig. For example integrating the speed log will give a measure of position of the pig at any instant, in order to determine the location of clogged sites.

Figure 2:
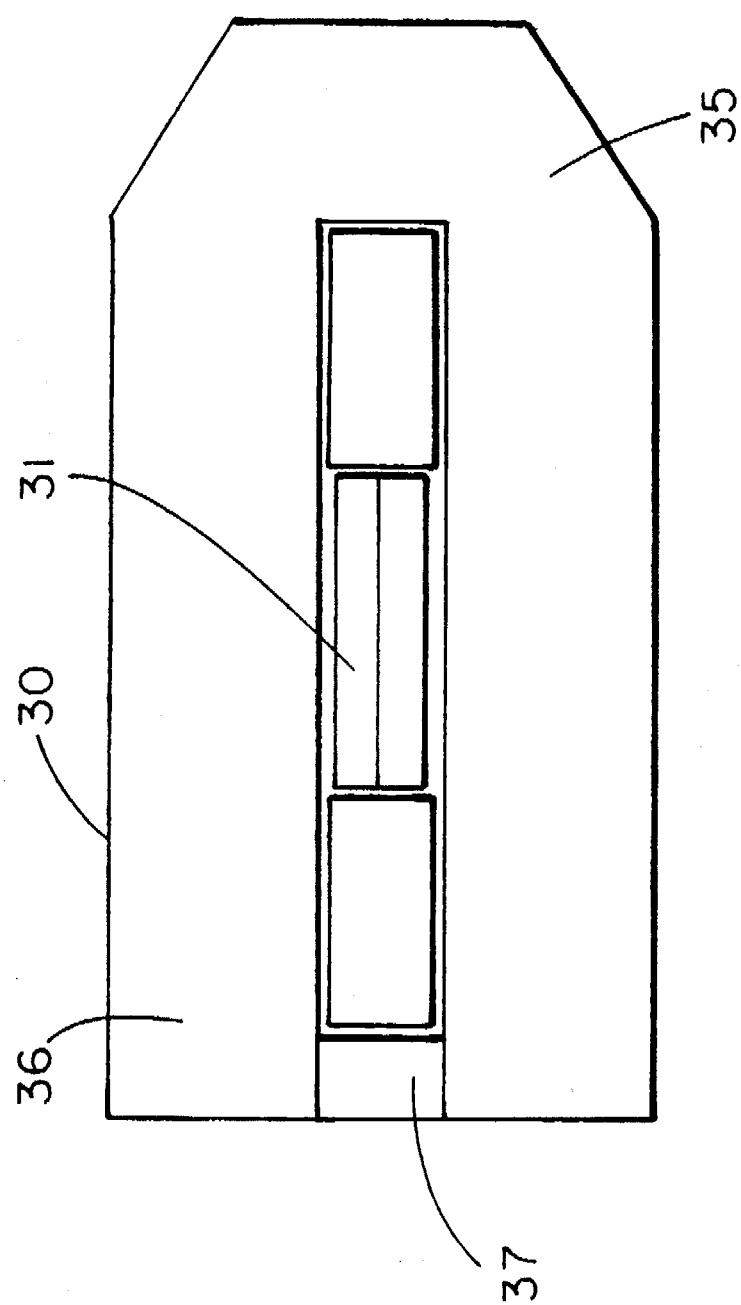
FIG. 2 shows a schematic side view of one embodiment of the pig which can be used in the process of the present invention.

Referring now to FIG. 2, pig (30) comprises three main parts:

i) A body (36) which is preferably, but not necessarily, cylindrical. Its geometrical shape is that best adapted for the specific desired application and it may, for example, be a sphere. The pig body is made up of a spongy expanded (foamed) polymer, or of a spongy elastomer, which can be selected from suitable known materials (one particularly preferred example of which is a flexible polyurethane foam), having a specific gravity below 40 kg per cubic meter. One of the ends of the pig (30) has a tapered conical shape (35);

ii) A blind hole (37);

iii) Finally, housed in the cavity defined by the hole (37), a pressure sensor (31) coupled to a single unity comprising a processor, memory and power source (battery), housed in any suitable container which is waterproof and pressure resistant.

One main advantage of the process of this invention over the prior art is that the high compressibility, imparted to the pig used in the present process by the very low density polymeric foam of which it is made, allows the pig in the present process to be introduced at various different launching openings, even if such opening is of reduced dimensions compared with the size of the pig. Thus, there is no longer the need to provide for various introduction means of various external diameters to be adapted to the various diameters of the pipelines which are to be freed of paraffinic clogs.

Note also that even in the case of high flowrates of crude throughout the pipeline, where the combination of pig and sensor need not occupy the whole of the cross-section of the pipeline, the pig and the sensor will still be displaced for travel throughout the pipeline by the flow. For lower flowrates of crude the combination of pig and sensor occupies the whole of the cross-section of the pipeline in order to secure the displacement or the travelling of the pig throughout the whole pipeline. This stems from the characteristics of the spongy material from which the pig is made, which allows for the displacement of the pig in whatever flowrate conditions: either high or low flowrate of fluid which may be liquid and/or gas.

Three main advantages of the present invention are apparent as regards the process:

i) the use of the present process implies in a dramatic reduction in the cost of the overall operation in view of the very low price of the pig used herein;

ii) the high efficiency of the process, which stems from the fact that the present pig can be made to pass easily through successive and sometimes severely reduced pipeline diameters, thus eliminating the need of providing various pigs for the various pipeline diameters; establishment of a technique for the measurement of the pressure gradient using pigs for monitoring undesirable clogging sites—even those critical sites of clogging such as those caused by strong deformation of the pipeline—which reduce the flow of fluids along extended, submerged or buried pipelines. No prior art process is known to effect such monitoring, for the reasons explained hereinbefore.

Based on the same principle of the acquisition of a pressure log, a temperature log can be obtained by placing a temperature sensor in the interior of the spongy pig either instead of or as well as the pressure sensor. The only difference is that the temperature sensor will sense temperature changes (for example due to insulation damages) in the outer surface of the pipeline, while in the case of the acquisition of the pressure log, the variable sensed will be the pressure inside the pipeline.

Other easily detectable advantages of the pressure log acquisition process of the present invention are as follows:

i) to validate a theoretical model for the expected deposition of paraffins in a pipeline dependent on all physical parameters involved in the flow of oil within the pipeline;

ii) to validate a theoretical model of the thermal gradient of a pipeline as well as to evaluate thermal insulation damages if a temperature sensor is placed inside of the pig;

iii) to evaluate thermal and mechanical performance of pipeline-dewaxing processes, such as those described in GB 2276218 A and EP 0642847 A1; and iv) to determine in a practical and economical way the schematic pressure log of pipelines located in sites of difficult access (for example, or irregular ground).

While the specification has set forth the advantages and novelty of the present invention, only a preferred embodiment of it has been described which can be varied at will by the experts without departing from the scope of the invention.

We claim:

1. A process for the acquisition of a log of a physical parameter throughout a pipeline, which comprises traversing a pipeline (40) with a pig (30) having a pressure responsive sensor housed therein, and continuously sensing and recording an internal pipeline pressure log throughout the whole extend of the pipeline (40) wherein the body (36) of the pig (30) is made up of foamed polymeric or elastomeric material of a density less than 40 kg per cubic meter to enable the pig (30) to pass a reduced diameter portion of the pipeline (40).

2. A process according to claim 1, wherein the pig (30) has a body (36) of a cylindrical shape with one of its ends having a tapered cone shape (35).

3. A process according to claim 2, wherein the sensor (31) is housed within a blind hole (37) in the interior of the pig (30) body.

4. A process according to claim 1, wherein the pig (30) is introduced in a launching opening of reduced diameter compared with that of the pig.

5. A process according to claim 1, wherein the sensor (31) is responsive to temperature.

6. A process according to claim 1, wherein the pressure log acquired through the sensor (31) indicates a further pressure drop, imposed on a steady pressure gradient, when the pig (30) encounters a clog (41, 42).

7. A process according to claim 6, further comprising detecting the rate of displacement of the pig (30) throughout the pipeline (40) for calculating the location and extent of clogs (41, 42).

8. A process according to claim 7, further comprising evaluating the performance of dewaxing processes of extended pipelines and/or which are located in places of difficult access by using said pressure log.

9. A process according to claim 7 further comprising recording a topographical log of extended pipelines and/or pipelines which are located in places of difficult access by using the pressure gradient.

* * * * *